INVENTORS.
John S. Hurst
William A. Pfeiler
Merwyn Sanders
Edwin F. Gammon

ATTORNEY.

Oct. 4, 1966    J. S. HURST ETAL    3,277,301
RADIOACTIVITY SMEAR SAMPLING METHOD AND APPARATUS
USING DATA PROCESSING CARDS
Filed Feb. 14, 1964    2 Sheets-Sheet 2

INVENTORS.
John S. Hurst
William A. Pfeiler
Merwyn Sanders
Edwin F. Gammon
BY

ATTORNEY.

ns Patent Office 3,277,301
Patented Oct. 4, 1966

3,277,301
RADIOACTIVITY SMEAR SAMPLING METHOD AND APPARATUS USING DATA PROCESSING CARDS
John S. Hurst, Knoxville, William A. Pfeiler, Norris, and Merwyn Sanders and Edwin F. Gammon, Knoxville, Tenn., assignors to the United States of America as represented by the United States Atomic Energy Commission
Filed Feb. 14, 1964, Ser. No. 345,054
7 Claims. (Cl. 250—83)

This invention relates generally to the measurement of surface contamination due to radioactive deposits, and more particularly to improved methods and apparatus for the measurement of such radioactive deposits through the use of smear samples taken from surfaces known or suspected of bearing radioactive deposits.

One of the most widely used techniques for maintaining a check on radioactive contamination within a process area is the rubbing of a piece of filter paper by hand over an exposed surface of the process area, thus accumulating on the filter a small representative quantity of the radioactive deposits which may be present on the rubbed surface. The collected particles are then analyzed in a scintillation counter for radioactivity. The sample obtained thusly, is usually called a "smear" and the wiping act, "smearing."

Characteristic of this sampling technique has been inaccuracy and a lack of reproducibility of the samples taken. This inaccuracy and lack of reproducibility arises from the manual nature of the smearing operation which produces smears highly dependent on both the wiping pressure exerted by the analyst and the total area he happens to wipe. Moreover, many surfaces, from which it is desired that a smear be taken, are relatively rough. The filter paper, being somewhat flimsy, frequently becomes torn or matted when rubbed over such surfaces, thereby providing an unacceptable smear sample. In addition, wiping by hand exposes the human hand to dangerous radiation and may lead to contamination of the skin of the operator.

The use of filter paper for smear taking also provides a difficult handling and processing problem when large numbers of smears are taken, as over a large plant, and it is desired to incorporate automatic counting equipment in the smear processing system. The filter paper, being flimsy, is not easily handled or identified by automatic equipment and therefore limits the degree of automatic processing which can be applied.

It is, therefore, a general object of the invention to provide a method and apparatus for the taking and analyzing of standardized, consistently reproducible smear samples.

Another object of the invention is to provide a method and apparatus for the taking of smear samples which is substantially independent of operator skill.

Another object of the invention is to provide a standardized smear collector which is readily adaptable to use in automatic processing equipment.

Still another object of the invention is to provide a standardized smear collector which may be readily marked and identified.

Other objects of the invention will become apparent from an examination of the following description of the invention and the appended drawings, wherein.

Figure 6:
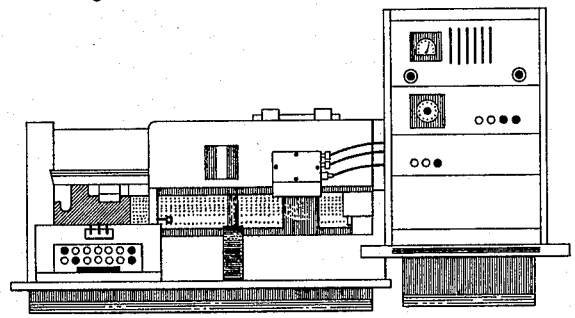
FIG. 6 illustrates automatic counting equipment for processing IBM cards on which smear samples have been taken.
Figure 7:
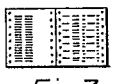

FIG. 7 schematically illustrates a printed report of smearing results as determined from IBM cards processed by the automatic counting equipment of FIG. 6.

In accordance with the present invention, a precoded data processing card is passed, as a smear collector, over the surface being tested. A mechanical card holder, having means for regulating the exact amount of surface area passed over, is utilized to force the card against the surface with a preselected uniform pressure. The card having a smear sample thereon is removed from the card holder and processed through automatic counting equipment which measures the radioactivity of each smear sample and then prints the result of each measurement together with the area code of each corresponding card on a record medium.

The physical properties of data processing cards utilized in this invention differ greatly from the properties of filter paper which has heretofore been used as a smear collector. The use of hard, impervious, smooth surfaced and relatively inflexible cards is, accordingly, diametrically opposed to the established use of filter paper which is soft, porous, rough surfaced and highly flexible. Prior to the present invention, properties similar to those possessed by filter paper were considered to be essential in any smear sampling medium.

Figure 1:
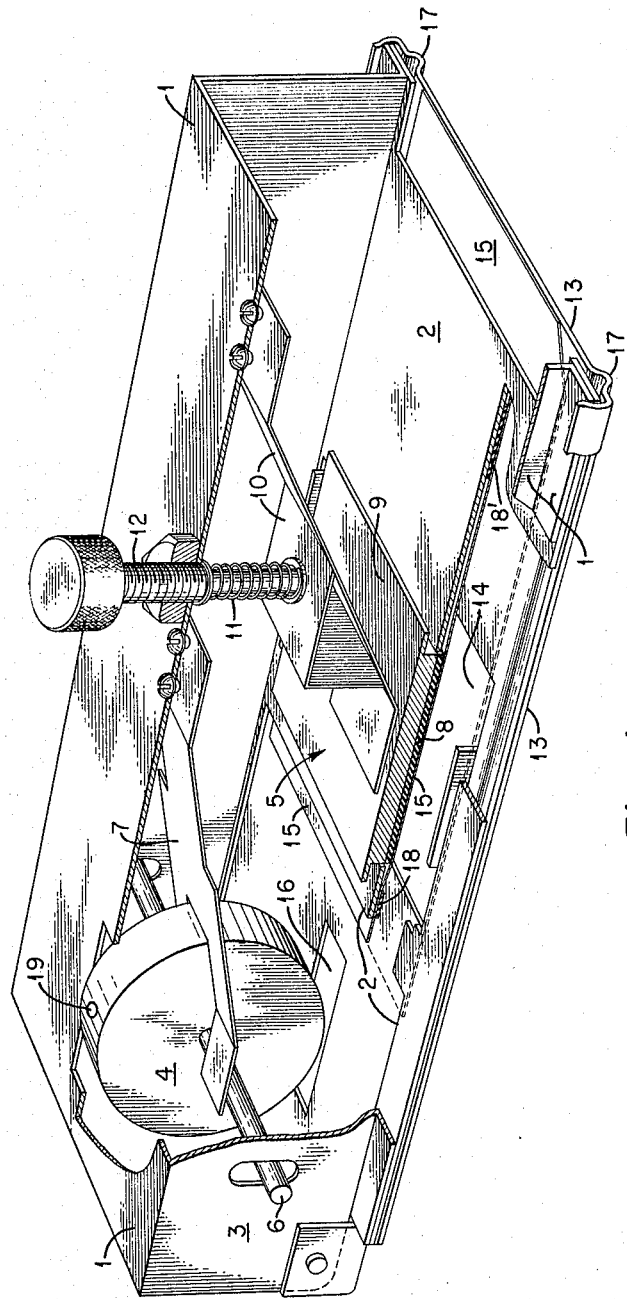
FIG. 1 is an isometric view of a smear taking device according to the present invention.

To facilitate an understanding of the invention, reference is made to FIG. 1 wherein a mechanical card holder designed for the taking of standardized smear samples using data processing cards is illustrated. The card holder is depicted as comprising a frame consisting of a top portion 1, a bottom portion 2, and connecting side walls 3. Bottom portion 2 is provided with appropriate openings from which protrude at least a portion of an index wheel 4 and a pressure pad 5. Index wheel 4, rotatably supported on a shaft 6, is vertically oriented between side walls 3. A spring member 7, in the form of a thin strip of steel, is rigidly secured to the top 1 of the card holder and exerts a force on shaft 6 so as to tend to force index wheel 4 downward in rolling contact against the surface from which a smear sample is being taken.

Pressure pad 5 consists of a foam rubber pad 8 cemented to a spring mounted backup plate 9. The spring mounting for backup plate 9 consists of a flat strip of steel 10 fastened at one end to the backup plate 9 and at its other end to top portion 1 of the card holder frame. A cylindrical helical spring member 11, mounted on an adjustable screw member 12, provides a means of varying the pressure exerted by pressure pad 5. Advancement of screw member 12 increases the compressive deflection of spring 11 thereby increasing the force exerted by steel strip 10 on pressure pad 5.

A bottom cover plate 13 is hinged at one end to the side walls 3 of the frame portion. Cover plate 13 has an opening 14 coincident with the opening in bottom portion 2 which permits pressure pad 5 to force a portion of data processing card 15 therethrough. Data processing cards 15, (hereafter also referred to as IBM cards 15), satisfying interim government specification G–C–00116B (GPO), can be satisfactorily used to collect smear samples according to the present invention. An opening 16 is also provided for index wheel 4. To insure that only the exposed IBM card and not the flat bottom of the cover plate contacts the surface being smeared, a pair of skids 17 is provided on the bottom of cover plate 13. By causing the device to glide on the skids, complete spring action can be realized by pressure pad 5 and index wheel 4. Rubber pads 18 affixed to the bottom portion 2 of the card holder frame and to the inside of bottom cover plate 13, grip the IBM card and prevent it from slipping within the card holder during a smearing operation.

Index wheel 4 may be provided with a small hole 19 or other suitable marking on its periphery to be used as an index by an operator for determining when the index wheel has completed one revolution. The diameter of the index wheel 4 is so chosen that smearing over a distance represented by the circumference of the index wheel will result in the coverage or smearing by the IBM card, of 100 sq. cm. of the surface being checked.

It is noted that as an alternative to the skids 17 and index wheel 4 of the subject embodiment, an elongated, rotatably mounted, endless belt could be used. The belt would serve both as an indexing means for gaging travel and as a support to space bottom cover plate 13 apart from the surface being smeared. Such an alternative indexing and supporting mechanism would be advantageous in some applications where skids are undesirable because of their tendency to scratch the surface being smeared.

Figure 2:
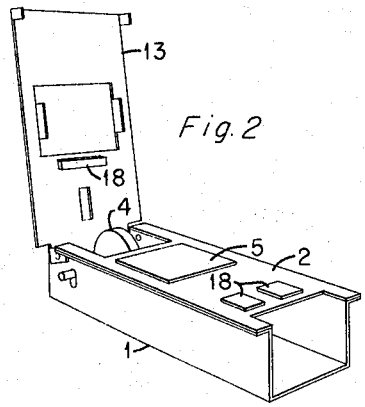
FIG. 2 is an isometric view of a card holder in open position prior to the positioning of an IBM card therein.
Figure 3:
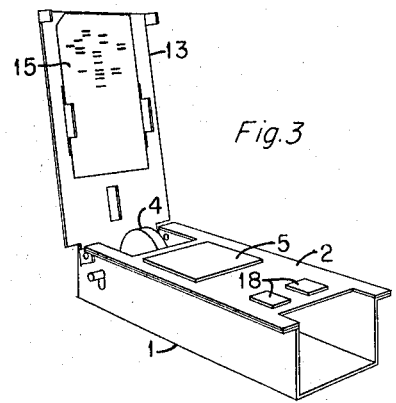
FIG. 3 is identical with FIG. 2 with the exception that in FIG. 3 a card has been positioned in the card holder.
Figure 5:
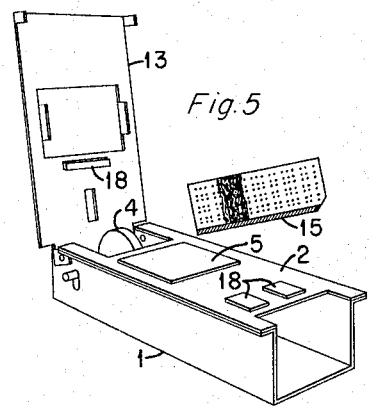
FIG. 5 is an isometric view of a card holder in open position and an IBM card which has been removed from the card holder following a smearing operation.
Figure 4:
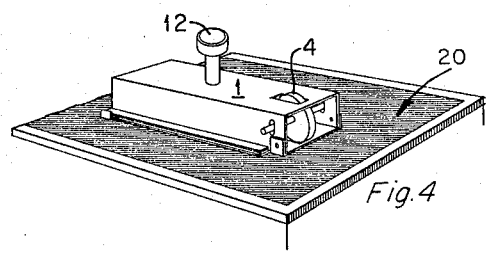
FIG. 4 is an isometric view showing a card holder positioned on a surface in a smear sample taking position.

FIGS. 2 through 7 illustrate, in a flow type diagram, a complete smear sampling operation from the loading of the IBM card into the card holder to the final readout of a smear report from the smear counting and recording system. In FIG. 2 the card holder is illustrated prior to the loading of an IBM card therein, with the hinged bottom cover plate 13 in an open position. Visible in this position are pressure pad 5 and index wheel 4, together with the openings therefore in cover plate 13. An IBM card, which has been precoded in an IBM 519 reproducer, is shown positioned on the open cover plate in FIG. 3. It can be seen from FIGS. 2 and 3 that upon the closing of bottom cover plate 13, a portion of the IBM card will be forced at least partially through the opening in the bottom cover because of the pressure applied to the card by pressure pad 5. This pressure is chosen to be 4 p.s.i. in the preferred embodiment. After the cover is closed, the card holder is inverted and a smear sample taken as illustrated in FIG. 4. The smear sample is taken by passing the card holder, with its carried IBM card, over a surface 20 which is being tested. The operator, in taking a sample, permits the index wheel 4 to make one complete revolution before removing the smeared card to insure a standardized smear with respect to the standardized area from which the sample is taken. The smeared area is typically 100 sq. cm. as is the preferred embodiment. FIG. 5 of the flow diagram shows the smear as it appears on the IBM card following smearing operation.

Following the smearing operation, the IBM cards carrying smear samples are taken from the card holder to a processing area such as illustrated in FIG. 6 where they are placed in an IBM 026 standard keypunch. As the cards have been pre-keypunched prior to the smearing operation with information indicating the time and location of the smear taken, they may be placed in the IBM 026 in any order without affecting the outcome of the processing operation. The IBM 026 then passes the individual cards under a crystal-type scintillation counter which generates impulses in response to impinging alpha radiation from the smear sample. The impulses from the counter are transmitted to a scaler and then to a timer and readout system. A counter control system stores the counts from individual cards in a memory cell to be later fed into a data decoder. The count rate information from the data decoder is transmitted to an IBM 026 standard keypunch where the individual radiation count rates are keypunched into the corresponding precoded cards. The cards, now containing all essential information including the location from which the smear was taken and the smear count rate, are next reproduced by an IBM 519 reproducer in uncontaminated form. The uncontaminated cards are processed by an IBM 1401 computer which provides a printed report of the smearing results as indicated in FIG. 7.

Thus in a very short time, the results of smear samples taken on data processing cards can be obtained and transmitted back to the process areas where the smear samples were taken. Appropriate action can then be taken to decontaminate any area found to be overburdened with radioactive or radioactivity-laden particles.

Many modifications of and deviations from the embodiments disclosed herein may be made without departing from the spirit and scope of the present invention. For example, equivalent data processing cards and equipment could be substituted for the IBM data processing cards and equipment described in the preferred embodiment. Alternate processing schemes could also be used which utilize data processing cards as smear collectors. Accordingly, the foregoing illustrative description of the embodiment should not be used in a limiting sense and the invention should be limited only by the scope of the claims appended hereto.

What is claimed is:

1. A smear sampling method for determining the extent and intensity of radioactive deposits on surfaces in a work area, comprising the steps of:
 (a) precoding a plurality of automatic data processing cards to indicate corresponding surfaces in said work area;
 (b) slidably passing, under predetermined pressure, a preselected portion of each of said cards over a predetermined area of said corresponding surfaces;
 (c) automatically counting the radiation from each card; and
 (d) automatically printing the radiation count and corresponding work area code of each of said cards on a record medium.

2. A smear sampling method for determining the extent and intensity of radioactive deposits on surfaces in a work area, comprising the steps of:
 (a) precoding a plurality of automatic data processing cards for corresponding surfaces in said work area;
 (b) slidably passing, under predetermined pressure, a preselected portion of each of said cards over a preselected area of said corresponding surfaces;
 (c) automatically counting the radiation from each of said cards;
 (d) keypunching each of said cards to indicate the radiation count from the corresponding smear contained thereon; and
 (e) tabulating said keypunched cards by a computer which provides therefrom a printed report of smear locations, times, and count rates.

3. A smear sampling method for determining the extent and intensity of radioactive deposits on surfaces in a work area, comprising the steps of:
 (a) precoding a plurality of automatic data processing cards for corresponding surfaces in said work area;
 (b) slidably passing, under predetermined pressure, a preselected portion of each of said cards over a preselected area of said corresponding surfaces;
 (c) automatically counting the radiation from each of said cards;
 (d) keypunching each of said cards to indicate the radiation count from the corresponding smears contained thereon;
 (e) reproducing said cards in uncontaminated form; and
 (f) tabulating the reproduced uncontaminated cards by a computer which provides therefrom a printed report of smear locations, times and count rates.

4. A device for the collection, from a surface suspected of bearing radioactive deposits, of a standardized smear sample on a data processing card comprising:
 (a) a hollow frame member having a top portion, a bottom portion and two side portions;
 (b) means for positioning said data processing card against the bottom portion of said frame member;

(c) a spring loaded pressure exerting means disposed within said frame member for exerting a preselected uniform pressure against a preselected portion of said data processing card; and (d) indexing means for indicating the surface area from which the smear sample is taken.

5. The device of claim 4 wherein said means for positioning said data processing card comprises a cover member hinged at one end to said side portions of said frame member and adapted to close upon said bottom portion of said frame member, said cover member having a first opening for said index wheel to protrude therethrough, a second opening to permit said data processing card to protrude therethrough, and a pair of skids disposed along the length of said cover so as to provide a bearing surface for said smear collecting device.

6. The device of claim 4 wherein said pressure exerting means comprises:

(a) a pressure pad abutting against said data processing card;

(b) a flat spring member communicating obliquely between said pressure pad and said top portion of said frame member;

(c) a cylindrical helical spring member adapted to press against said flat spring member; and (d) means for adjusting the force exerted by said cylindrical helical spring member against said flat spring member.

7. The device of claim 4 wherein said indexing means comprises an index wheel rotatably mounted within said frame member and adapted to partially protrude from the bottom of said frame member.

No references cited.

RALPH G. NILSON, *Primary Examiner.*

ARCHIE R. BORCHELT, *Examiner.*